(12) United States Patent
Peasley et al.

(10) Patent No.: US 8,215,459 B2
(45) Date of Patent: Jul. 10, 2012

(54) CABLE OPERATED DRUM BRAKES

(75) Inventors: David Peasley, Coventry (GB); Luigi Tessitore, Savona (IT); Michael John Louis MacDonald, Redditch (GB); William Ernest Haines, Southam (GB)

(73) Assignee: Automotive Products Italia (SV) s.r.l. (IT)

( * ) Notice: Subject to any disclaimer, the term of this patent is extended or adjusted under 35 U.S.C. 154(b) by 0 days.

(21) Appl. No.: 10/522,856

(22) PCT Filed: Jul. 30, 2003

(86) PCT No.: PCT/GB03/03310
§ 371 (c)(1),
(2), (4) Date: Dec. 2, 2005

(87) PCT Pub. No.: WO2004/013512
PCT Pub. Date: Feb. 12, 2004

(65) Prior Publication Data
US 2006/0151257 A1    Jul. 13, 2006

(30) Foreign Application Priority Data

Aug. 2, 2002  (GB) .................................. 0217953.9
Feb. 18, 2003  (GB) .................................. 0303689.4

(51) Int. Cl.
*F16D 65/14*  (2006.01)
(52) U.S. Cl. .................. 188/79.55; 188/2 D; 188/106 A
(58) Field of Classification Search .................. 188/2 D, 188/106 A, 79.55, 79.57, 79.58
See application file for complete search history.

(56) References Cited

U.S. PATENT DOCUMENTS

| | | | | |
|---|---|---|---|---|
| 3,064,767 A | * | 11/1962 | Wieger | 188/106 A |
| 4,569,112 A | * | 2/1986 | Dussault | 188/2 D |
| 4,753,325 A | * | 6/1988 | Jaksic | 188/2 D |
| 4,955,458 A | * | 9/1990 | Shellhause | 188/2 D |
| 6,502,670 B1 | * | 1/2003 | Asai | 188/2 D |

FOREIGN PATENT DOCUMENTS

| | | | |
|---|---|---|---|
| FR | 2644863 A1 | * | 9/1990 |
| FR | 2646217 A1 | * | 10/1990 |
| JP | 2002310207 A | * | 10/2002 |

* cited by examiner

*Primary Examiner* — Thomas J Williams
(74) *Attorney, Agent, or Firm* — RatnerPrestia

(57) ABSTRACT

A cable operated drum brake has an internal brake operating lever with a quick-attach device for an operating cable. A cable attachment tube projects from a backplate of the brake and the operating cable has an inner cable with a latching formation on the end thereof and a cable outer sleeve. An end portion of the operating cable is slideable towards the backplate within the tube up to a first position at which further movement towards the backplate is stopped by contact between an abutment on the tube and a cooperating abutment on the cable outer sleeve. When the latching formation has moved past the quick-attach device, the cable is then subsequently moveable away from the backplate within the tube to a second position in which the latching formation is fully engaged with the quick-attach device. A fastener maintains the latching formation engaged with the quick-attach device during subsequent operation.

22 Claims, 5 Drawing Sheets

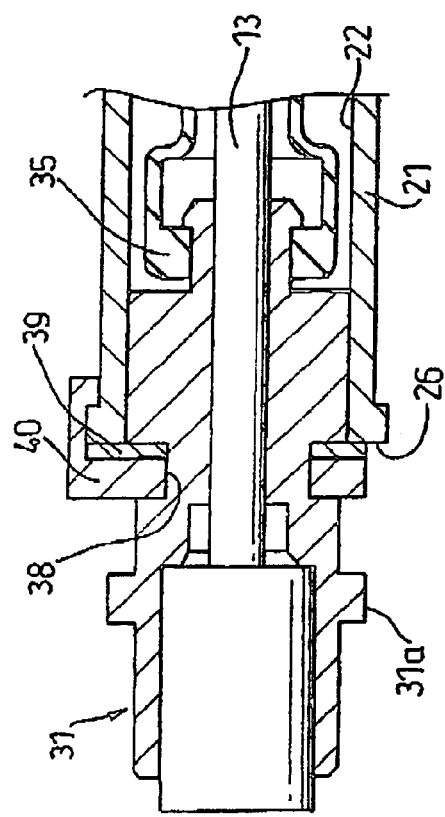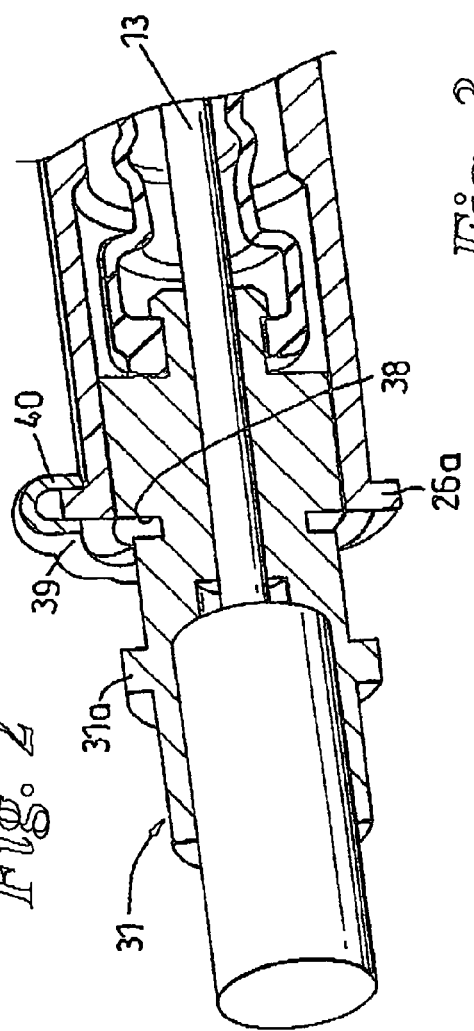

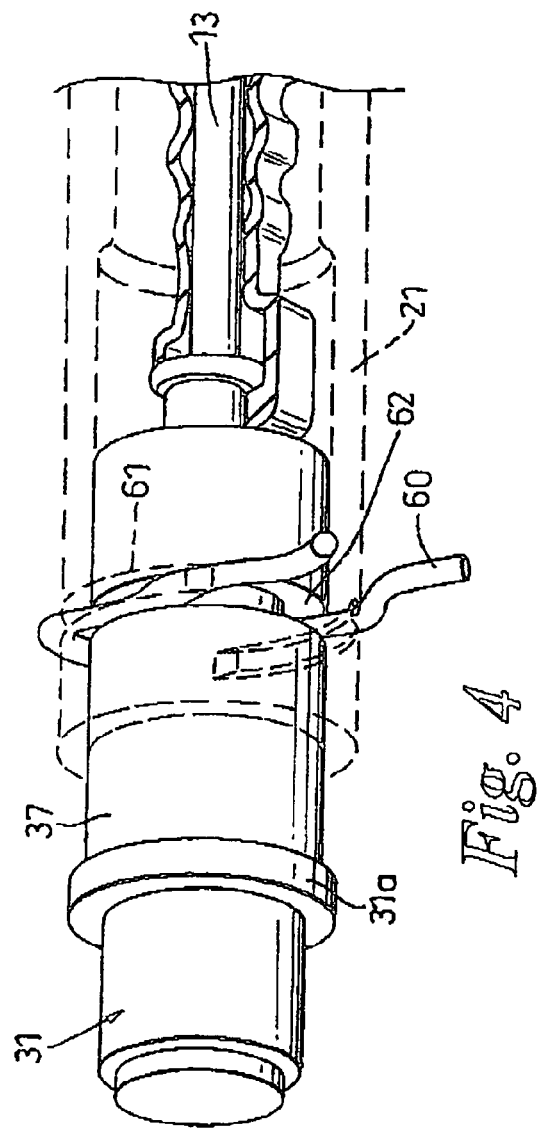
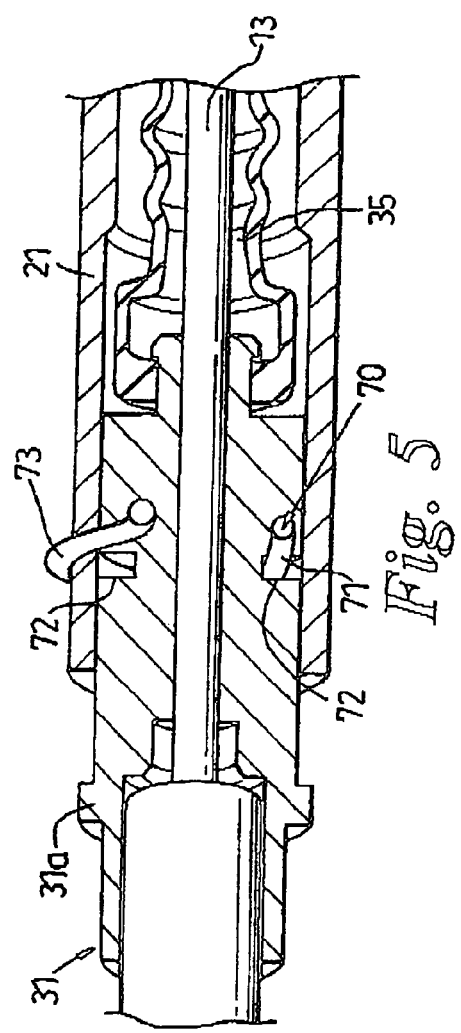

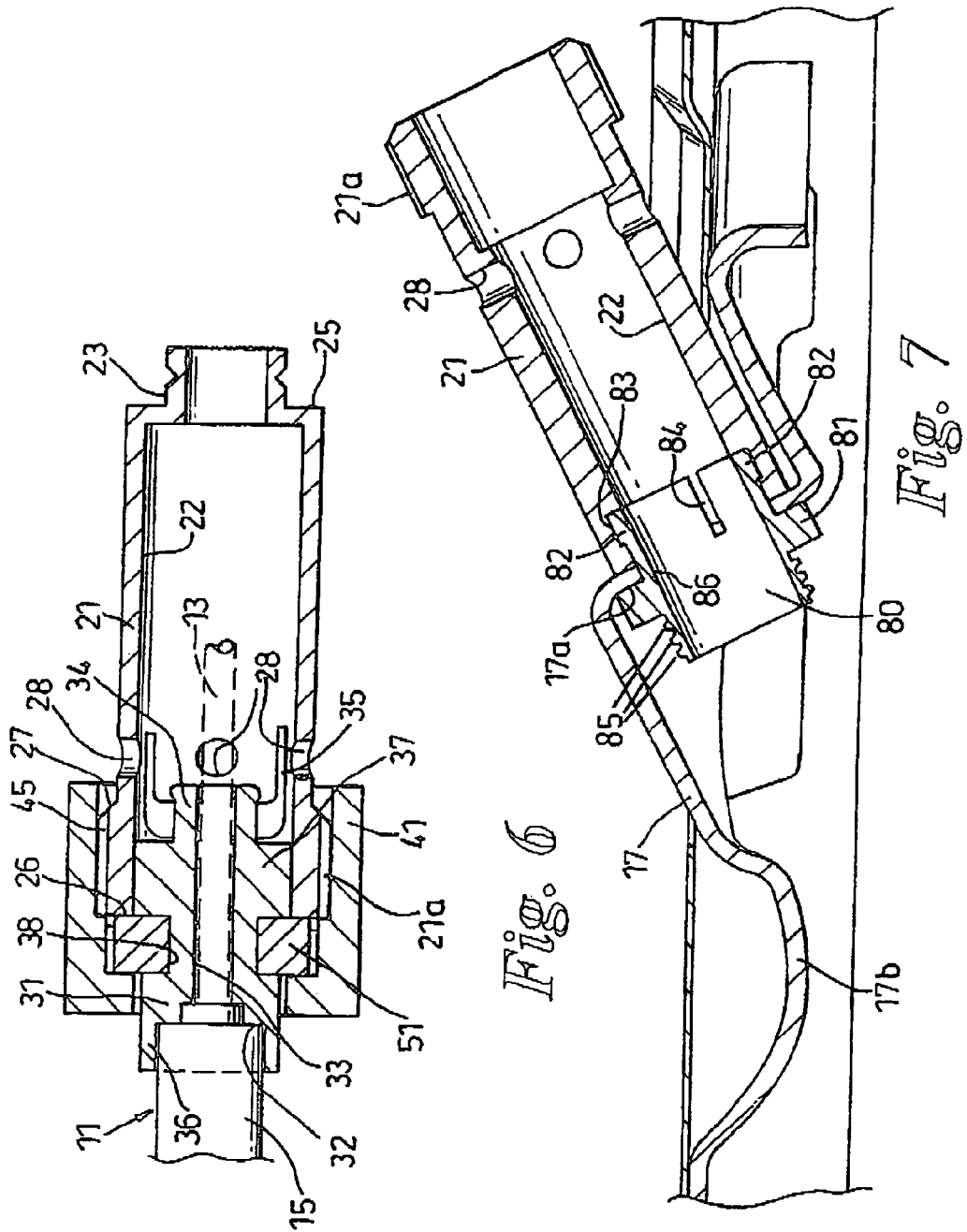

CABLE OPERATED DRUM BRAKES

FIELD

This invention relates to cable operated drum brakes and in particular to arrangements and methods for connecting an operating cable to such a drum brake using a "quick-attach" device.

BACKGROUND OF THE INVENTION

When building vehicles on a production assembly line, the rear drum brake assembly of a motor vehicle braking system may be pre-assembled before being attached to the vehicle body and the parking brake cables may be subsequently attached to an internal brake operating lever through an opening in the drum brake back plate with a "quick-attach device on the internal parking brake lever even though direct access to the braking mechanism is precluded. Examples of such quick-attach" devices are well known and are shown, for example, in GB patent 2,328,257 and U.S. Pat. No. 4,753,325 and form no part of the present invention. U.S. Pat. No. 5,311,793 also discloses a different type of drum brake actuator in which the quick-attach device comprises a resilient spring member located in a passage between a pair of cooperating actuating levers acting between adjacent ends of a pair of brake shoes [or the ends of a single generally U-shaped shoe of the form shown in EP patent 0392829] the spring member deflects a cable nipple to a latching position on one of the levers and subsequently ensures that the nipple does not disengage the latching position on this lever.

One problem with such "quick-attach" devices is that there is no way of verifying that the cable is successfully latched to the lever until the vehicle braking system is assembled and the parking brake is actuated. This is particularly so for electrically operated parking brakes. A further problem with electrically operated parking brakes is that the normal cable travel required for assembly purposes is a significant proportion of the total cable travel available during an operational stroke of the actuation mechanism.

The present invention provides a cable operated drum brake which enables the successful connection of the operating cable to the parking brake lever to be verified, and also reduces assembly travel in the cable.

STATEMENTS OF INVENTION

According to the present invention there is provided a cable operated drum brake having;
  an internal brake operating lever for connection with a brake operating cable,
  a cable attachment tube projecting from a backplate of the brake,
  said operating cable having a cable inner with a latching formation on an end thereof and a cable outer sleeve,
  a quick-attach device for maintaining the latching formation in connection with the lever.
  an end portion of the operating cable being slideable towards the backplate within the tube up to a first position at which further movement towards the backplate is stopped by contact between an abutment on the tube and a cooperating abutment on the cable outer sleeve, said first position ensuring that the latching formation has moved passed the quick-attach device,
  the end portion cable being subsequently moveable away from the backplate within the tube to a second position in which the latching formation on the cable inner is fully connected with the operating lever, and
  a fastening means to lock the end portion of the cable in said second position relative to the tube to maintain the latching formation fully connected with the operating lever during subsequent operation of the brake.

Such a cable operated drum brake is particularly suited for use as electrically actuated drum in disc parking brake but can also be used as conventional manually applied parking brake.

A method of attaching an operating cable having a cable inner with a latching formation on an end thereof and a cable outer sleeve, to a drum brake having a cable attachment tube projecting from a backplate of the brake, an internal brake operating lever and a quick-attach device for maintaining the latching formation in connection with the lever, the method comprising:
  sliding an end portion of the operating cable towards the backplate within the tube up to a first position at which further movement towards the backplate is stopped by contact between an abutment on the tube and a co-operating abutment on the cable outer sleeve, said first position ensuring that the latching formation has moved passed the quick-attach device,
  subsequently moving the end portion cable away from the backplate within the tube to a second position in which the latching formation on the cable inner is fully connected with the operating lever, and
  engaging fastening means to lock the end portion of the cable in said second position relative to the tube to maintain the latching formation fully connected with the operating lever during subsequent operation of the brake.

The quick-attach device may be provided on a parking brake lever pivoted on a brake shoe.

Alternatively the quick-attach device may comprise a resilient spring member located in a passage between a pair of co-operating levers acting between the adjacent ends of a pair of brake shoes or the ends of a single generally U-shaped shoe the spring member being arranged to deflect the latching formation to a latching position on one of the levers and to subsequently ensure that the latching formation does not disengage the latching position.

The abutment on the tube may be formed by the end of the tube through which the cable slides.

Alternatively the abutment on the tube may be formed by an internal shoulder formed in a bore of the tube in which the cable slides or on an end of a sleeve in the bore of the tube.

The cable outer sleeve is preferably provided with an end fitting having an abutment which co-operates with the end of the tube or the internal shoulder or the sleeve.

The fastening means may comprise a clip which is engaged in a groove in the end fitting when the cable is in the second position, the clip being held against the end of the tube to prevent movement away from the first and second position.

The clip may be held against the end of the tube by a cap which is clipped over the clip and radially projecting flange adjacent the end of the tube.

The clip and cap may be formed as a single component both engaging the groove in the end fitting.

Alternatively the clip may be held against the end of the tube by integral tangs on the clip which engage a radially projecting flange adjacent the end of the tube.

In a further alternative the clip may be held against the end of the tube by an internally threaded collar held captive on the end fitting which engages an external thread on the end portion of the tube.

In yet a further alternative the fastening means may comprise a wire clip which extends generally perpendicular to the tube and engages a groove in the end fitting and a hole or a slot or slots in the tube.

The attachment tube may be welded to the backplate.

An attachment sleeve may be provided which has a radially extending flange for engagement with the inside of the backplate and which projects into an end portion of the attachment tube adjacent the backplate and which incorporates snap connectors which snap into a fastening formation formed on the inside of the end portion of the tube to hold the tube against the backplate. This attachment sleeve may be formed from plastics material.

The attachment sleeve may function as the only means of attachment of the attachment tube to the backplate or may be used to initially hold the tube to the backplate prior to welding. This is particularly advantageous when the tube is orientated at an acute angle relative to be backplate when access to the junction of the tube and backplate may be restricted.

Preferably the attachment sleeve has an internal bore of the same diameter as the internal bore of the tube to avoid forming ledges or other projections on which dirt may lodge or which may damage any cable sealing boot which may be fitted on the inside of the backplate.

Preferably the end of the attachment sleeve on the inside of the backplate has formations thereon (eg, axially spaced ribs) which assist in the attachment thereto of a cable guidance spring which guides the inner of the cable towards the quick-attach device.

Again preferably the backplate has one or more formations thereon which support the guidance spring so that the cable inner follows a smoothly curing path on its way to the quick-attach device. Such a construction greatly improves the life of the cable which, particularly when used in conjunction with an electrical actuated and electronically controlled parking brake, may be applied more frequently than in a manually operated parking brake.

The attachment tube may include slots or other openings to allow any water which reaches the inside of the tube to drain out.

The cable is preferably provided with a rubber boot which at one end seals to the end fitting on the outer cable sleeve and at its other end seals onto the cable inner. This boot prevents water and mud etc entering between the inner and outer sleeve of the cable. This boot is housed within the tube but during installation of the cable and, as the cable is moved to its first position, may partially enter the guidance spring.

The present invention referred to above will now be described, by way of example only, with reference to the accompanying drawings in which:

FIGS. 2 to 6 show modified forms of the cable fastening means for the attachment arrangement of FIG. 1;

FIG. 7 shows an alternative tube attachment arrangement, and

Figure 1:
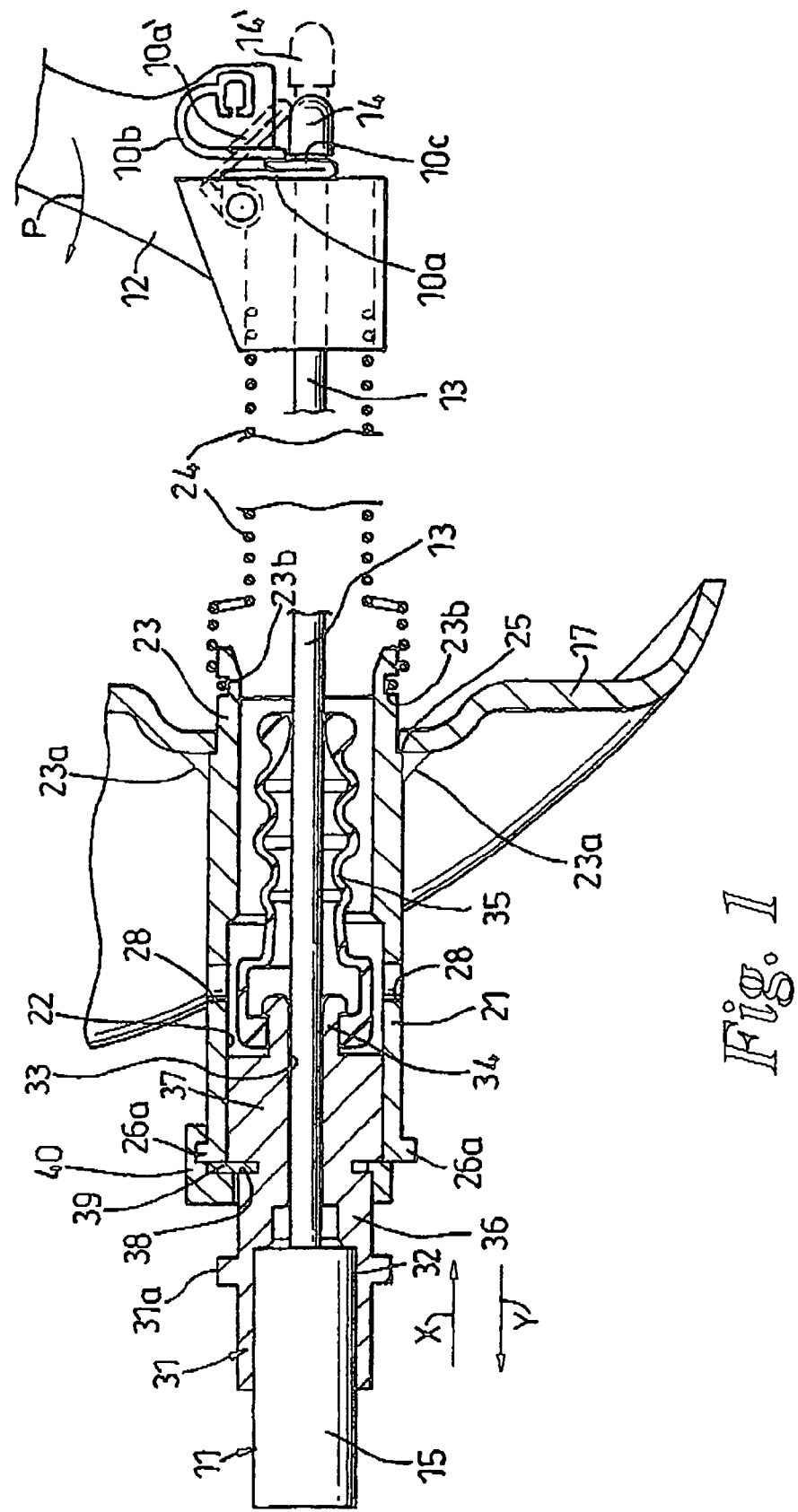
FIG. 1 shows a section through a cable attachment arrangement of a drum brake in accordance with the present invention.

With reference to FIG. 1 of the drawings, there is shown part of a cable operated drum-type parking brake in which a Bowden cable 11 is attached to an internal brake lever 12 of the brake. The Bowden cable 11 has an inner cable 13 with a nipple 14 firmly attached to one end and which is slideable within an outer sleeve 15. The nipple is attached to the brake lever 12 using a quick-attach device 10 (shown only schematically in FIG. 1) on the brake lever 12.

Any form of quick-attach device 10 may be employed. For example, as shown in FIG. 1, the quick-attach device may comprise a pivoting latch plate 10a which is biased to its latching position shown in FIG. 1 by a spring 10b carried on lever 12. Latching plate 10a is arranged to be displaced (to dotted line position 10a') against the action of spring 10b by the nipple 14 to allow nipple 14 to pass the latch 10a (to position 14') so that latch 10a can snap back to its latched position thus allowing nipple 14 to be drawn back against latch 10a and hence connected with lever 12. This type of quick-attach arrangement is shown and described in more detail in, for example GB patent 2,328,257.

Alternatively, for example, a ramp-type quick-attach arrangement as disclosed in U.S. Pat. No. 4,753,325 may be used.

The cable is attached to a backplate 17 of the brake via a tube 21 having a central bore 22 through which the inner cable 13 and nipple 14 can pass. The tube 21 has a shoulder 25 adjacent one end with spigot portion which is welded at 23a to backplate 17 and has a groove 23b therein for the attachment of a guidance spring 24 which extends from tube 21 to lever 12.

Tube 21 has a plurality of spaced holes 28 passing through the tubular sidewall which act as drain holes and allow the escape of water, water vapour, mud etc.

The cable 11 has a cylindrical end fitting 31 with a larger diameter inner portion 37 and a smaller diameter outer portion 36 with an annular groove 38 located axially between the two different diameter portions. The outer end portion 36 of the fitting 31 has a coaxial circular recess 32 which accommodates the end portion of the outer sleeve 15 of the cable 11. A coaxial through bore 33 in the fitting provides a passageway for the inner cable 13 but does not permit the passage of the nipple 14.

The inner end portion 37 is a slide fit In the bore 22 and has a hollow spigot 34 thereon on which a rubber bellows seal 35 is mounted. The seal 35 acts between the spigot 34 and inner cable 13 to prevent the ingress of dirt and water into the cable.

A cable fastening means is provided in the form of a circlip or E-clip 39 which engages groove 38 and a plastics retaining cap 40 which overlies clip 39 and snaps over a radially extending flange 26a adjacent end 26 of tube 21 to hold clip 39 against the end 26 of tube 21 as will be described below.

End fitting 31 has a radially extending flange 31a which acts as a stop to contact end 26 of tube 21 and hence limit the insertion of end fitting 31 into tube 21 as described below.

The method of attachment of cable 11 to handbrake lever 12 is as follows.

Cable 11 is offered up to attachment tube 21 with the inner 13 and its nipple 14 projecting therefrom. The larger diameter portion 37 of end fitting 31 is inserted into the tube and the cable outer 15 is pushed down the tube in direction of arrow X into a "first position" in which the flange 31a on the end fitting 31 contacts the end 26 of the tube.

With the cable in this "first position" the nipple 14 has passed completely down the guidance spring 24 and has deflected aside the quick-attach latch 10a' (see deflected position 10a' of the latch shown in dotted detail) to occupy the position shown at 14' in FIG. 1 thus allowing latch 10a to snap back into its latch position under the action of spring 10b.

The cable end fitting 31 is then moved away from the backplate in the direction of arrow Y until the nipple engages face 10c of flap 10a and the groove 38 is now outside the end 26 of tube 21.

The circlip or E-clip 39 is now inserted in the groove 38 and the plastics retaining cap 40 snapped over clip 39 to hold clip 39 against the end 26 of tube 31 thus securing the cable outer 15 in a fixed "second" position relative to the attachment tube 21.

With the cable held in this "second position" the nipple 14 is ensured to remain correctly latched with latch 10a during the future operation of the brake.

As will be appreciated, by allowing the cable to be inserted Into the attachment tube to the "first position" and then drawn back to the "second position" as described above the necessary insertion travel of the cable to properly engage the quick-attach latch 10a does not detract from the working stroke of the cable. This is particularly important when the cable is operated by an electrical actuator whose working stroke is relatively limited.

Also, as will be appreciated, the operator has a positive indication that the cable has been inserted far enough into the attachment tube 31 to definitely engage the quick-attach latch 10a when the flange 31a contacts the end 26 of tube 21. Further, when the assembler draws the cable back to the second position he can feel that the nipple 14 has correctly engaged the face 10c of the quick-attach latch 10a.

FIGS. 2 to 6 show various alternative forms of fastening means for securing the cable outer 15 in its second position.

Referring to FIG. 2, this shows an arrangement in which an E-clip 39 and plastics overlaying retaining cap 40 are moulded as one unit which engages a larger groove 38 in the end fitting 31.

In FIG. 3 the E-clip 39 engages groove 38 and is provided with integral retent on tangs 40 which engage behind flange 26a.

In FIG. 4 a wire clip 60 extends generally perpendicular to tube 21 and engages slots 61 in tube 21 and a groove 62 in the larger diameter portion 37 of end fitting 31.

FIG. 5 shows a further clip arrangement in which a clip 70 has one limb 71 which engages a groove 72 in the larger diameter portion 37 of end fitting 31 and passes through a hole (not visible) in tube 21. The other limb 73 of clip 70 extends around the exterior of tube 21, no slot being necessary.

FIG. 6 shows a still further alternative in which the tube 21 is externally threaded at 21a and these threads are engaged by a collar 41 with internal threads 45 which is captive on the cable end fitting 31 by the larger diameter inner portion 37 of the fitting. After the end fitting 31 has been moved to its second position a generally C-shaped clip or spacer 51 having a key hole shaped opening therein is snapped into groove 38. This clip 51, which may be formed from glass filled polymide or other suitable materials such as mild steel, brass etc., abuts the end 26 of tube 21 and is held in position by the collar 41 screwed on to tube 21. In this arrangement the insertion of the end fitting into tube 21 is limited by a stop (not shown) which may be formed by a step in the bore 22 of tube 21 or by a sleeve within bore 22 or other suitable means.

FIG. 7 shows an alternative tube arrangement in which tube 21 is fastened to backplate 17 by a separate plastics attachment sleeve 80. Sleeve 80 has a radially projecting flange 81 for contact with a rear face 17a of backplate 17. Sleeve 80 projects into the end portion of tube 21 and incorporates snap connectors 82 which engage a groove 83 formed in the bore 22 of tube 21. The snap connectors 82 are formed on attachment sleeve 80 by slotting the sleeve at 84. These slots may also assist in allowing any liquid which may find its way into bore 22 to drain out.

The attachment sleeve 80 may function as the only means of attachment of the tube to the backplate or may be used to initially hold the tube to the backplate prior to welding. This is particularly advantageous when the tube is orientated at an acute angle relative to be backplate when access to the junction of the tube and backplate may be restricted.

The attachment sleeve 80 has circumferentially extending ribs 85 formed thereon over which coils of guidance spring 24 are pushed. As can be seen from FIG. 7 the internal bore 86 of sleeve 80 is the same diameter as bore 22 thus preventing the formation of any ledge on which dirt and other detritus may collect and also assisting in preventing any adverse abrasion of sealing boot 35 which slides up and down bore 22 during attachment of the cable.

Tube 21 is provided with an externally threaded portion 21a on which an external collar held captive on end fitting 31 may be threadedly engaged. This collar holds the cable in a fixed position relative to tube 21 after the cable has been fully engaged with the quick-attach latch as described above in relation to FIG. 6.

Figure 8:
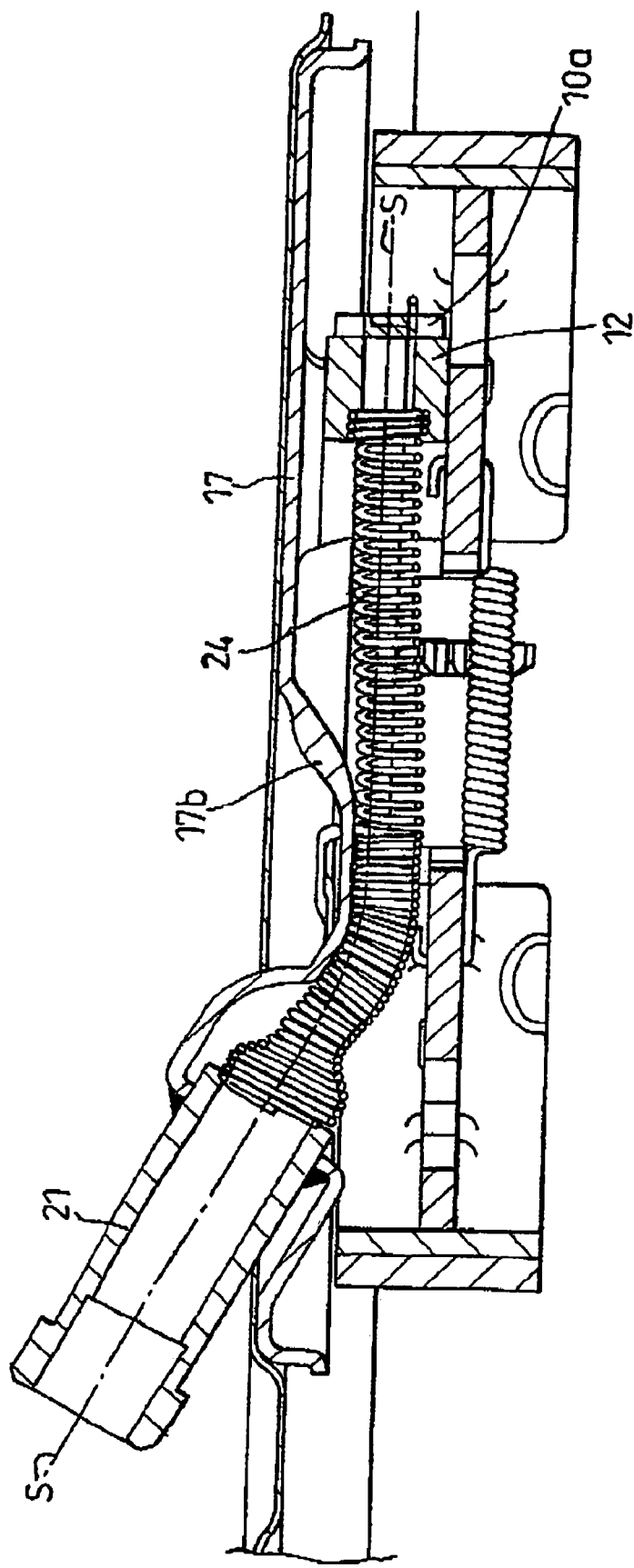
FIG. 8 shows a typical cable guidance spring run from the attachment tube to the auto-latching device.

FIGS. 7 and 8 show the formation of backplate 17 at location 17b into a depression which holds guidance spring 24 in the correct position so that the centre line of cable inner 13 passes smoothly from the end 23 of tube 21 to the quick-attach latch 10a along the path S-S as shown in FIG. 8. By defining the path of the cable inner in this manner the smooth operation of the cable over a long period of time is assured. This is particularly important when the hand brake function is operated electrically under the control of an electronic device since the hand brake may be applied on many occasions under the control of the electronic device when it would not be applied by the vehicle driver. For example, the algorithm of the electronic control device may have a function which automatically applies the hand brake after the vehicle has been-stationary for a predetermined period of time and/or when the vehicle comes to rest on an incline.

The invention is also applicable to drum brake actuators of the kind disclosed in U.S. Pat. No. 5,311,793 in which the "quick-attach" device comprises a resilient spring member located in a passage between a pair of co-operating actuating levers acting between the adjacent ends of a pair of brake shoes [or, the ends of a single generally U-shaped shoe of the form shown in EP patent 0392829] the spring member deflects the cable nipple to a latching position on one of the levers and subsequently ensures that the nipple does not disengage the latching position on this lever. When used in connection with this type of brake actuator the cable attachment tube 21 described above will extend generally perpendicular to the back plate of the brake aligned with the cable run.

What is claimed is:

1. A cable operated drum brake having:
   an internal brake operating lever for connection with a brake operating cable,
   a cable attachment tube projecting from a backplate of the brake,
   said operating cable having an inner cable with a latching formation on an end thereof and a cable outer sleeve,
   a quick-attach device for maintaining the latching formation in connection with the lever,
   an end portion of the operating cable being slideable towards the backplate within the tube up to a first position at which further movement towards the backplate is stopped by contact between an abutment on the tube and a co-operating abutment on the cable outer sleeve, said first position ensuring that the latching formation has moved passed the quick-attach device,
   the end portion cable being subsequently moveable away from the backplate within the tube to a second position in which the latching formation on the inner cable is fully connected with the operating lever, and a fastening means to lock the end portion of the cable in said second position relative to the tube to maintain the latching formation fully connected with the operating lever during subsequent operation of the brake.

2. A drum brake according to claim 1 in which the quick-attach device is provided on a parking brake lever pivoted on a brake shoe.

3. A drum brake according to claim 1 in which the quick-attach device comprises a resilient spring member located in a passage between a pair of cooperating levers acting between the adjacent ends of a pair of brake shoes or the ends of a single generally U-shaped shoes the spring member being arranged to deflect the latching formation to a latching position on one of the levers and to subsequently ensure that the latching formation does not disengage the latching position.

4. A drum brake according to claim 1 in which the abutment on the tube is formed by the end of the tube through which cable slides.

5. A drum brake according to claim 1 in which the abutment on the tube comprises an internal shoulder formed in a bore of the tube in which the cable slides.

6. A drum brake according to claim 1 in which the abutment on the tube comprises an end of a sleeve in a bore of the tube in which the cable slides.

7. A drum brake according to claim 5 in which the cable outer sleeve is provided with an end fitting having an abutment which cooperates with the end of the tube or the internal shoulder or a sleeve in a bore of the tube in which the cable slides.

8. A drum brake according to claim 7 in which the fastening means comprises a clip which is engaged in a groove in the end fitting when the cable is in the second position, the clip being held against the end of the tube to prevent movement away from the first and second position.

9. A drum brake according to claim 8 in which the clip is held against the end of the tube by a cap which is clipped over the clip and radially projecting flange adjacent the end of the tube.

10. A drum brake according to claim 9 in which the clip and cap are formed as a single component both engaging the groove in the end fitting.

11. A drum brake according to claim 8 in which the clip is held against the end of the tube by integral fangs on the cup which engage a radially projecting flange adjacent the end of the tube.

12. A drum brake according to claim 8 in which the clip is held against the end of the tube by an internally threaded collar held captive on the end fitting which engages an external thread on the end portion of the tube.

13. A drum brake according to claim 7 in which the fastening means comprises a wire clip which extends generally perpendicular to the tube and engages a groove in the end fitting and a hole or a slot or slots in the tube.

14. A drum brake according to claim 1 in which the attachment tube is welded to the backplate.

15. A drum brake according to claim 1 in which an attachment sleeve is provided which has a radially extending flange for engagement with the inside of the backplate and which projects into an end portion of the attachment tube adjacent the backplate and which incorporates snap connectors which snap into a fastening formation formed on the inside of the end portion of the tube to hold the tube against the backplate.

16. A drum brake according to claim 15 in which the attachment sleeve is used to hold the attachment tube to the backplate prior to welding.

17. A drum brake according to claim 15 In which the attachment sleeve has an internal bore of the same diameter as the internal bore of the tube to avoid forming ledges or other projections on which dirt may lodge or which may damage any cable sealing boot which may be fitted on the inside of the backplate.

18. A drum brake according to claim 15 in which the end of the attachment sleeve on the inside of the backplate has formations thereon which assist in the attachment thereto of a cable guidance spring which guides the inner of the cable towards the quick-attach device.

19. A drum brake according to claim 18 in which the backplate has one or more formations thereon which support the guidance spring so that the inner cable follows a smoothly curving path on its way to the quick-attach device.

20. A drum brake according to claim 1 in which the attachment tube may include slots or other openings to allow any water which reaches the inside of the tube to drain out.

21. A drum brake according to claim 7 in which the cable is provided with a rubber boot which at one end seals to the end fitting on the outer cable sleeve and at its other end seals onto the inner cable.

22. A method of attaching an operating cable having a inner cable with a latching formation on an end thereof and a cable outer sleeve, to a drum brake having a cable attachment tube projecting from a backplate of the brake, art an internal brake operating lever and a quick-attach device for maintaining the latching formation in connection with the lever, the method comprising:
sliding an end portion of the operating cable towards the backplate within the tube up to a first position at which further movement towards the backplate is stopped by contact between an abutment on the tube and a cooperating abutment on the cable outer sleeve, said first position ensuring that the latching formation has moved passed the quick-attach device,
subsequently moving the end portion cable away from the backplate within the tube to a second position in which the latching formation on the inner cable is fully connected with the operating lever, and
formation fully connected with the operating lever during subsequent operation of the brake.

* * * * *